United States Patent
Umemoto

(10) Patent No.: US 7,087,681 B2
(45) Date of Patent: Aug. 8, 2006

(54) METHOD FOR PREPARING POLYMERS CONTAINING CYCLOPENTANONE STRUCTURES

(75) Inventor: Teruo Umemoto, Westminster, CO (US)

(73) Assignee: IM&T Research, Inc., Denver, CO (US)

( * ) Notice: Subject to any disclaimer, the term of this patent is extended or adjusted under 35 U.S.C. 154(b) by 259 days.

(21) Appl. No.: 10/845,838

(22) Filed: May 14, 2004

(65) Prior Publication Data

US 2004/0210033 A1   Oct. 21, 2004

Related U.S. Application Data

(62) Division of application No. 09/939,141, filed on Aug. 24, 2001, now Pat. No. 6,767,446.

(51) Int. Cl.
    *C08F 8/06* (2006.01)
(52) U.S. Cl. ............... 525/360; 525/332.1; 525/366; 525/367; 525/386
(58) Field of Classification Search ............ 525/360, 525/366, 367, 386
    See application file for complete search history.

(56) References Cited

U.S. PATENT DOCUMENTS

| | | | |
|---|---|---|---|
| 4,009,151 A | | 2/1977 | Pearson et al. |
| 5,900,327 A | * | 5/1999 | Pei et al. .................... 428/690 |
| 5,902,907 A | | 5/1999 | Takahashi et al. |
| 5,942,641 A | | 8/1999 | Tanaka et al. |
| 6,835,296 B1 | | 12/2004 | Umemoto |
| 2005/0045492 A1 | | 3/2005 | Umemoto |

FOREIGN PATENT DOCUMENTS

| | | | |
|---|---|---|---|
| EP | 0259229 | * | 3/1988 |
| JP | 61-271323 | | 12/1986 |

OTHER PUBLICATIONS

Sheats et al, "Chemical Aspects of Polymeric Electroluminescent Devices", ACC. Chem. Res., 32(3), 193-200, 1999.*

Rault-Berthelot et al., "The Anodic Oxidation of Fluorene and Some of Its Derivatives. Conditions for the Formation of A New Conducting Polymer", Journal of Electroanal. And Chem. Interfacial Electrochem., vol. 182, No. 1, pp. 187-192, 1985 (abstract only).

Rault-Berthelot et al., "The Polyfluorenes: A Family of Versatile Electroactive Polymers; Electropolymerization of Fluorenes", New Journal of Chemistry, vol. 10, Sep. 23, 1985.

Schiavon et al., "Anodic and Cathodic Deposition of Electroactive Polyfluorene Films", Journal of Electroanal. Chem., vol. 186, pp. 191-199, 1985.

Uckert et al., "2,7-Poly (9-fluorene): A Trap-Free Electron-Injection Material with a High Charge Carrier Mobility for Use in Light-Emitting Diodes", Advanced Materials, vol. 12, No. 12, 2000.

Uckert et al., "A Precursor Route to 2,7-Poly (9-fluorenone)", Macromolecules, vol. 32, pp. 4519-4524, 1999.

Waltman et al., "The Electrochemical Oxidation and Polymerization of Polycyclic Hydrocarbons", Electrochemical Science and Technology, pp. 631-634, Mar. 1985.

Zecchin et al., "Redox Polymer Films From Cathodic Coupling of 4,4'-Dibromobenzophenone and 2,7-Dibromofluorenone", Journal of Electroanal. Chem., vol. 215, pp. 377-383, 1986.

* cited by examiner

*Primary Examiner*—Bernard Lipman
(74) *Attorney, Agent, or Firm*—Dorsey & Whitney LLP

(57) ABSTRACT

A method to electrolytically polymerize aromatic hydrocarbons and oxidize cyclopentane structures within the hydrocarbons into cyclopentanone structures is disclosed including a method to electrolyze fluorene in the presence of an ester to produce poly(9-fluorenone). A method to electrolytically oxidize polymers having cyclopentane structures to polymers having cyclopentanone structures is also disclosed including a method to electrolyze poly(fluorene) to produce poly(9-fluorenone). In addition, a method to chemically oxidize polymers containing cyclopentane structures into polymers containing cyclopentanone structures is disclosed, including a method to oxidize poly(fluorene), with a chemically prepared oxidizing agent, to produce poly(9-fluroenone).

12 Claims, 5 Drawing Sheets

METHOD FOR PREPARING POLYMERS CONTAINING CYCLOPENTANONE STRUCTURES

CROSS REFERENCE TO RELATED APPLICATION

This application is a divisional of and claims priority to U.S. patent application Ser. No. 09/939,141, now U.S. Pat. No. 6,767,446, entitled "Method for Preparing Polymers Containing Cyclopentanone Structures", filed on Aug. 24, 2001. The disclosure of the application is hereby incorporated by reference herein.

FIELD OF THE INVENTION

This application relates generally to a method for the production of polymers having at least one unit containing at least one cyclopentanone structure condensed with at least two aromatic rings by electrolyzing aromatic compounds that have at least one cyclopentane structure condensed with at least two aromatic rings, or by electrolytic or chemical oxidation of polymers that have at least one unit containing at least one cyclopentane structure condensed with at least two aromatic rings, and more particularly to a method for the electrolysis of fluorene or its derivatives, and for the oxidation of poly(fluorene) or its derivatives, to poly(9-fluorenone) or its derivatives.

BACKGROUND OF THE INVENTION

Isomers of poly(9-fluorenone), such as 2,7-poly(9-fluorenone), may be employed in bi/multilayer light-emitting diodes (LED) operated with Mg as a cathode. Uckert, F. et. al., *Advanced Materials*, Vol. 12, No. 12, p.p. 905–908 (2000). However, poly(9-fluorenone) has proven difficult to prepare, in particular, 9-fluorenone does not appear to have been electrolytically polymerized to date. Zecchin, S., et al., *Journal of Electroanalytical Chemistry*, Vol. 215, p.p. 377–383 (1986).

Currently, there are two main methods for preparing poly(9-fluorenone), and in particular, 2,7-poly(9-fluorenone). One method uses five separate and distinct steps, starting from malonic ester. The malonic ester is treated to produce 2,2-dioctylmalonic ester and in a separate step subsequently reduced with lithium aluminum hydride to provide a diol compound, 2,2-dioctyl-1,3-propanediol. The diol compound is then combined with 2,7-dibromo(9-fluorenone) which must be produced from fluorene in two separate steps. The result of the combination of the diol with the 2,7-dibromo(9-fluorenone), under appropriate conditions, is 2,7-dibromo-spiro(4',4'-dioctyl-2',6'-dioxocyclohexane-1',9-fluorene). The 2,7-dibromo-spiro(4',4'-dioctyl-2',6'-dioxocyclohexane-1',9-fluorene) is polymerized with a nickel catalyst to provide 2,7-poly(spiro(4',4'-dioctyl-2',6'-dioxocyclohexane-1', 9-fluorene)). The 2,7-poly(spiro(4',4'-dioctyl-2',6'-dioxocyclohexane-1',9-fluorene)) is treated with dichloroacetic acid to give the final product, 2,7-poly (9-fluorenone). Uckert, F., et al., *Macromolecules*, Vol. 32, No. 14, p.p. 4519–4524 (1999).

In a second method for preparing poly(9-fluorenone), 2,7-dibromo-9-fluorenone, obtained by a two-step process from fluorene, is converted to $Ni(PPh_3)_2$(2-bromo-7-fluorenonyl)Br, which is then reduced electrochemically to give 2,7-poly(9-fluorenone). Zecchin, S., et al., *Journal of Electroanalytical Chemistry*, Vol. 215, p.p. 377–383 (1986).

Each method requires several separate steps and both have proven to be complicated and troublesome, involving the use of many potentially hazardous chemicals. Further, the methods have generally resulted in low polymer yields and high levels of impurities or byproducts.

Recently, Zecchin et al. alleged that 2,7-poly(9-fluorenone) films could be obtained from 2,7-poly(fluorene) films via oxidation with electrochemically generated superoxide. Zecchin, S., et al., *Journal of Electroanalytical Chemistry*, Vol. 215, p.p. 377–383 (1986). The report, however, provided no analysis of the film material to support the findings and Uckert et al. (*Macromolecules*, Vol. 32, No. 14, p.p. 4519–4524 (1999)) has disputed that the polymer obtained was in fact 2,7-poly(9-fluorenone), based on inconsistencies within Uckert's data. Therefore, it is unclear if the Zecchin described superoxide method has utility for preparing poly(9-fluorenone).

As such, the methods for preparing poly(9-fluorenone) have proven to be of limited value. Accordingly there is a need for a simple and cost-effective method for producing poly(9-fluorenone) as well as other polymers having cyclopentanone structures. Against this backdrop the present invention has been developed.

SUMMARY OF THE INVENTION

Embodiments of the present invention include the electrolytic production of polymers wherein each polymer contains at least one unit having at least one cyclopentanone structure condensed with at least two aromatic rings. The method includes the electrolysis of a starting material in the presence of an ester. The particular polymer produced by the methods of the present invention depends on the starting material. The starting materials are aromatic compounds that have at least one cyclopentane structure condensed with at least two aromatic rings. Such materials are polymerized and the cyclopentane structure is oxidized into a cyclopentanone structure by methods of the present invention.

One example of an embodiment of the present invention is a method for producing poly(9-fluorenone) by electrolysis of fluorene in the presence of an ester. Embodiments of the method include passing an electric current through an electrolytic mixture comprising fluorene, an ester, and an electrolyte. Note that, depending on the ester, electrolyte, and reaction conditions, an additional solvent may be included in the electrolytic mixture to dissolve the ester, fluorene or electrolyte, or to increase the yield of the poly(9-fluorenone).

Polymers containing at least one unit that has at least one cyclopentane structure condensed with at least two aromatic rings may also be used as a starting material. In embodiments using polymers as starting materials, the cyclopentane structures within the polymer are oxidized to the cyclopentanone structures. One example of this type of embodiment is a method for producing poly(9-fluorenone) from poly (fluorene) via electrolytic oxidation.

Additional embodiments of the present invention include a method of producing polymers containing at least one unit that includes at least one cyclopentanone structure condensed with at least two aromatic rings via chemical oxidation of polymer starting materials. One example of the chemical oxidation embodiments of the present invention is a method for producing poly(9-fluorenone) from poly(fluorene) via chemical oxidation with a chemically prepared oxidizing agent.

These and various other features as well as advantages which characterize the present invention will be apparent from a reading of the following detailed description and a review of the associated drawings.

DETAILED DESCRIPTION

Figure 1:
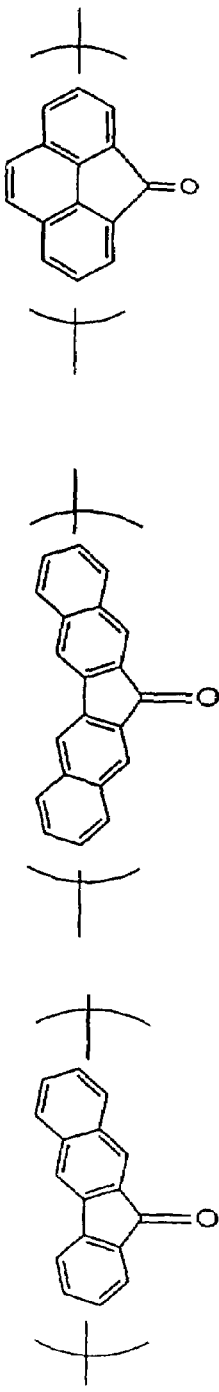
FIG. 1 shows examples of polymers containing at least one unit having at least one cyclopentanone structure created by embodiments of the present invention.
Figure 1:
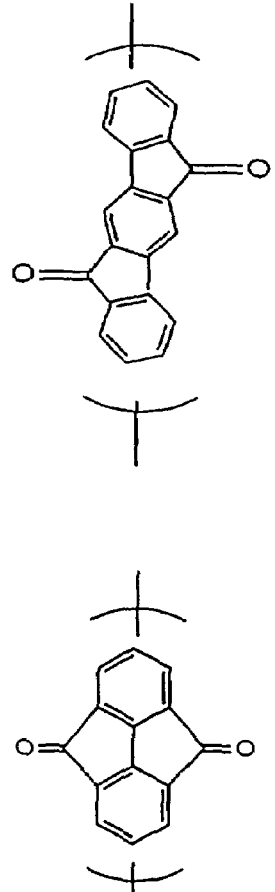
Figure 1:
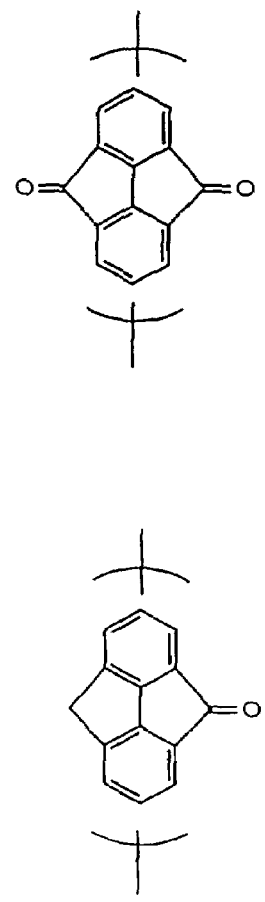

The following definitions are provided to facilitate understanding of certain terms used frequently herein and are not meant to limit the scope of the present disclosure.

Definitions:

"Alkoxy group of $C_1$ to $C_{10}$" when used in the context of the present invention are exemplified by methoxy, ethoxy, propoxy, isopropoxy, butoxy, isobutoxy, tert-butoxy, pentoxy, hexyloxy, heptyloxy, octyloxy, nonyloxy, and decyloxy "Alkoxycarbonyl group of $C_2$ to $C_{10}$" when used in the context of the present invention are exemplified by methoxycarbonyl, ethoxycarbonyl, propoxycarbonyl, butoxycarbonyl, pentoxycarbonyl, hexyloxycarbonyl, heptyloxycarbonyl, octyloxycarbonyl, nonyloxycarbonyl, and decyloxycarbonyl.

"Alkyl group of $C_1$ to $C_{10}$" when used in the context of the present invention are exemplified by methyl, ethyl, propyl, isopropryl, butyl, isobutyl, tert-butyl, penty, hexyl, heptyl, octyl, nonyl, and decyl.

"Aryl group of $C_6$ to $C_{10}$" when used in the context of the present invention are exemplified by phenyl, tolyl, xylyl, fluorophenyl, chlorophenyl, bromophenyl, iodophenyl, difluorophenyl, trifluorophenyl, pentafluorophenyl, (trifluoromethyl)phenyl, bis(trifluoromethyl)phenyl, cyanophenyl, and naphthyl.

"Aryloxy groups of $C_6$ to $C_{10}$" when used in the context of the present invention are exemplified by phenoxy, tolyloxy, and naphthoxy.

"Aryloxycarbonyl group of $C_7$ to $C_{11}$" when used in the context of the present invention are exemplified by phenoxycarbonyl, tolyloxycarbonyl, and naphthoxycarbonyl.

"Electrolytic mixture" refers to any liquid mixture that is capable of conducting an electric current.

"Ester" refers to carbonic esters and lactones, as well as simple esters, such as formates, acetates, propionates, and butyrates, and more complex esters, such as pentoates, decanoates, benzoates, toluates, icosanoates, and the like.

"Haloalkyl group of $C_1$ to $C_{10}$" when used in the context of the present invention are exemplified by fluoromethyl, chloromethyl, bromomethyl, iodomethyl, difluoromethyl, dichloromethyl, trifluoromethyl, trichloromethyl, trifluoroethyl, perfluoroethyl, trifluoropropyl, perfluoropropyl, perfluorobutyl, perfluoropentyl, perfluorohexyl, perfluoroheptyl, perfluorooctyl, perfluoronanyl, and perfluorodecyl.

"Halogen atom" or "halogen" when used in the context of the present invention is exemplified by fluorine, chlorine, bromine, and iodine atoms.

"Poly(9-fluorenone)" refers to any polymer that has at least one 9-fluorenone unit and/or at least 1% W/W 9-fluorenone units, and preferably a polymer having at least 10% W/W 9-fluorenone units, more preferably a polymer having at least 50% W/W 9-fluorenone units, and most preferably at least 80% W/W 9-fluorenone units. It should be understood that such polymers may contain one or more of the possible isomers of 9-fluorenone units within the polymer structure, including for example, but not limited to, the 1,5-isomer, the 1,6-isomer, the 1,7-isomer, the 1,8-isomer, the 2,5-isomer, the 2,6-isomer, the 2,7-isomer, the 2,8-isomer, the 3,5-isomer, the 3,6-isomer, the 3,7-isomer, the 3,8-isomer, the 4,5-isomer, 4,6-isomer, 4,7-isomer, and the 4,8-isomer. Such polymers are preferably at least a total of 3 units of 9-fluorenone or of 9-fluorenone and other units in length and are more preferably at least 7 units in length, more preferably 20 units in length, more preferably 50 units in length, furthermore preferably at least 165 units in length, and most preferably at least 200 units in length.

"Poly(fluorene)" refer to any polymer having at least one fluorene unit and/or at least 1% W/W fluorene units, and preferably a polymer having at least 10% W/W fluorene units, more preferably a polymer having at least 50% W/W fluorene units, and most preferably at least 80% W/W fluorene units. It should be understood that such polymers may contain any and all possible isomers of fluorene units within the polymer structure, including for example, but not limited to, the 1,5-isomer, the 1,6-isomer, the 1,7-isomer, the 1,8-isomer, the 2,5-isomer, the 2,6-isomer, the 2,7-isomer, the 2,8 isomer, the 3,5-isomer, the 3,6-isomer, the 3,7-isomer, the 3,8-isomer, the 4,5-isomer, 4,6-isomer, 4,7-isomer, and the 4,8-isomer.

"Unit" when used in the context of a polymer refers to any isomer of a monomer contained in the polymer, such that "a polymer having at least one unit of fluorene" refers to any polymer that has at least one fluorene structure of any isomer within the polymer chain.

Electrolytic Production of Polymers Containing Cyclopentanone Structures:

Embodiments of the present invention include the electrolytic production of polymers from a starting material in the presence of an ester. Polymers that can be produced by methods of the present invention include polymers containing at least one unit that has at least one cyclopentanone structure condensed with at least two aromatic rings. A preferred example of the present invention is the electrolytic production of poly(9-fluorenone). Other preferred exemplary polymers that can be produced by the methods of the present invention include, but are not limited to, poly(benzo[b]fluoren-11-one), poly(dibenzo[b, h]fluoren-12-one), poly(cyclopenta[def]phenanthren-4-one), poly(8H-cyclopenta[def]fluoren-4-one), and poly(cyclopenta[def]fluorene-4,8-dione), and poly(indeno[1,2-b]fluorene-6,12-dione), as shown in FIG. 1.

The starting materials for use in the present invention are aromatic compounds that have at least one cyclopentane structure condensed with at least two aromatic rings. In addition, the starting material can be polymers that have at least one unit containing at least one cyclopentane structure condensed with at least two aromatic rings.

One preferred embodiment of the starting materials for use in the methods of the present invention has the general formula (I):

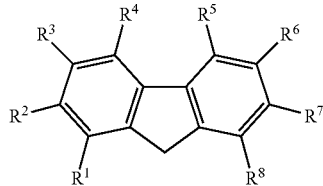

wherein any of the adjacent groups $R^1$ and $R^2$, $R^2$ and $R^3$, $R^3$ and $R^4$, $R^5$ and $R^6$, $R^6$ and $R^7$, $R^7$ and $R^8$ may be bonded together by a group of the general formula —$CR^9$=$CR^{10}$—$CR^{11}$=$CR^{12}$—, or be a group with the general formula (II):

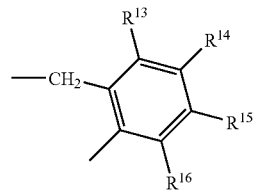

thus forming additional ring structures. Furthermore, the adjacent group $R^4$ and $R^5$ may be bonded together by a group with the general formula —$CR^{17}$=$CR^{18}$— or —$CH_2$—. Simultaneously, at least two of the groups $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$ are hydrogen atoms. The remaining groups can be any combination of hydrogen atoms, halogen atoms, alkyl groups of $C_1$ to $C_{10}$, haloalkyl group of $C_1$ to $C_{10}$, aryl groups of $C_6$ to $C_{10}$, alkoxy groups of $C_1$ to $C_{10}$, aryloxy groups of $C_6$ to $C_{10}$, alkoxycarbonyl groups of $C_2$ to $C_{10}$, and aryloxycarbonyl groups of $C_7$ to $C_{11}$.

A simple example of a starting material, wherein the groups $R^1$, $R^2$, $R^3$, $R^4$, $R^5$, $R^6$, $R^7$, and $R^8$ are hydrogen, is fluorene. When fluorene is used as a starting material, the method of the present invention produces poly(9-fluorenone), as described in greater detail below.

Another example of a starting material is 11 H-Benzo[b]fluorene, as shown below:

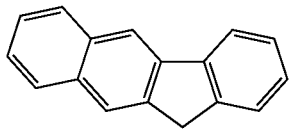

which would produce polymers having recurring units of benzo[b]fluoren-11-one (see FIG. 1).

Another example of a starting material for use with the present invention is 4H-cyclopenta[def]phenanthrene, wherein the adjacent groups $R^4$ and $R^5$ are bonded to —$CR^{17}$=$CR^{18}$— and where $R^{17}$ and $R^{18}$ are hydrogen and the remaining R groups are hydrogen:

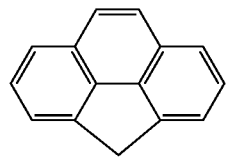

When used as a starting material, 4H-cyclopenta[def]phenanthrene can be used to produce polymers having units of cyclopenta[def]phenanthrene-4-one (see FIG. 1).

Another example of a starting material for use with the present invention is 4,8-dihydro-cyclopenta[def]fluorene, wherein the adjacent groups $R^4$ and $R^5$ are bonded to a methylene —$CH_2$— and the remaining R groups are hydrogen:

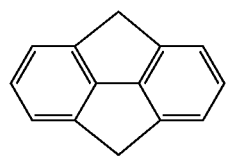

When used as a starting material, 4,8-dihydro-cyclopenta[def]fluorene can be used to produce polymers having units of 8H-cyclopenta[def]flouren-4-one and/or cyclopenta[def]fluorene4,8-dione (see FIG. 1).

Another example of a starting material for use with the present invention is 6,12-dihydro-indeno[1,2-b]fluorene, wherein the adjacent $R^2$ and $R^3$ are bounded to a group having the general formula:

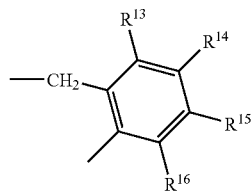

($R^2$ is bonded to the $CH_2$ carbon), where $R^{13}$, $R^{14}$, $R^{15}$ and $R^{16}$ are hydrogen and the remaining R groups are hydrogen:

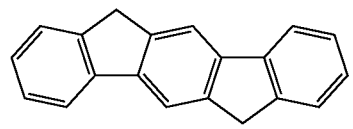

When used as a starting material, 6,12-dihydroindeno[1,2-b]fluorene can be used to produce polymers having units of 12H-indeno[1,2-b]fluoren-6-one and/or indeno[1,2-b]fluorene-6,12-dione (see FIG. 1).

Embodiments of the present invention include the electrolytic production of polymers from the starting materials described above in the presence of an ester, and, alternatively, from polymers containing at least one unit of the starting materials described above in the presence of an ester. For purposes of illustration, embodiments of the present invention are described with respect to the electrolytic production of poly(9-fluorenone) from fluorene and, alternatively, from poly(fluorene). However, it should be clear to one of skill in the art, that the methods described below and throughout the specification are equally applicable to preparing polymers from any of the starting materials described above, or from any polymer that incorporates at least one unit of the starting materials described above, all of which are considered to be within the scope of the present invention.

Methods Utilizing Electrolysis of Fluorene in the Presence of an Ester:

An embodiment of present invention is the electrolysis of fluorene carried out in the presence of an ester, to form poly(9-fluorenone). The electrolysis is achieved by flowing electric current between electrodes immersed in an electrolytic mixture comprising fluorene, an ester and an electrolyte. Note that, depending on the ester and electrolyte used, an additional solvent may be required to dissolve the ester, electrolyte or fluorene, or used to increase the yield of the product, and may be included in the electrolytic mixture.

Figure 2:
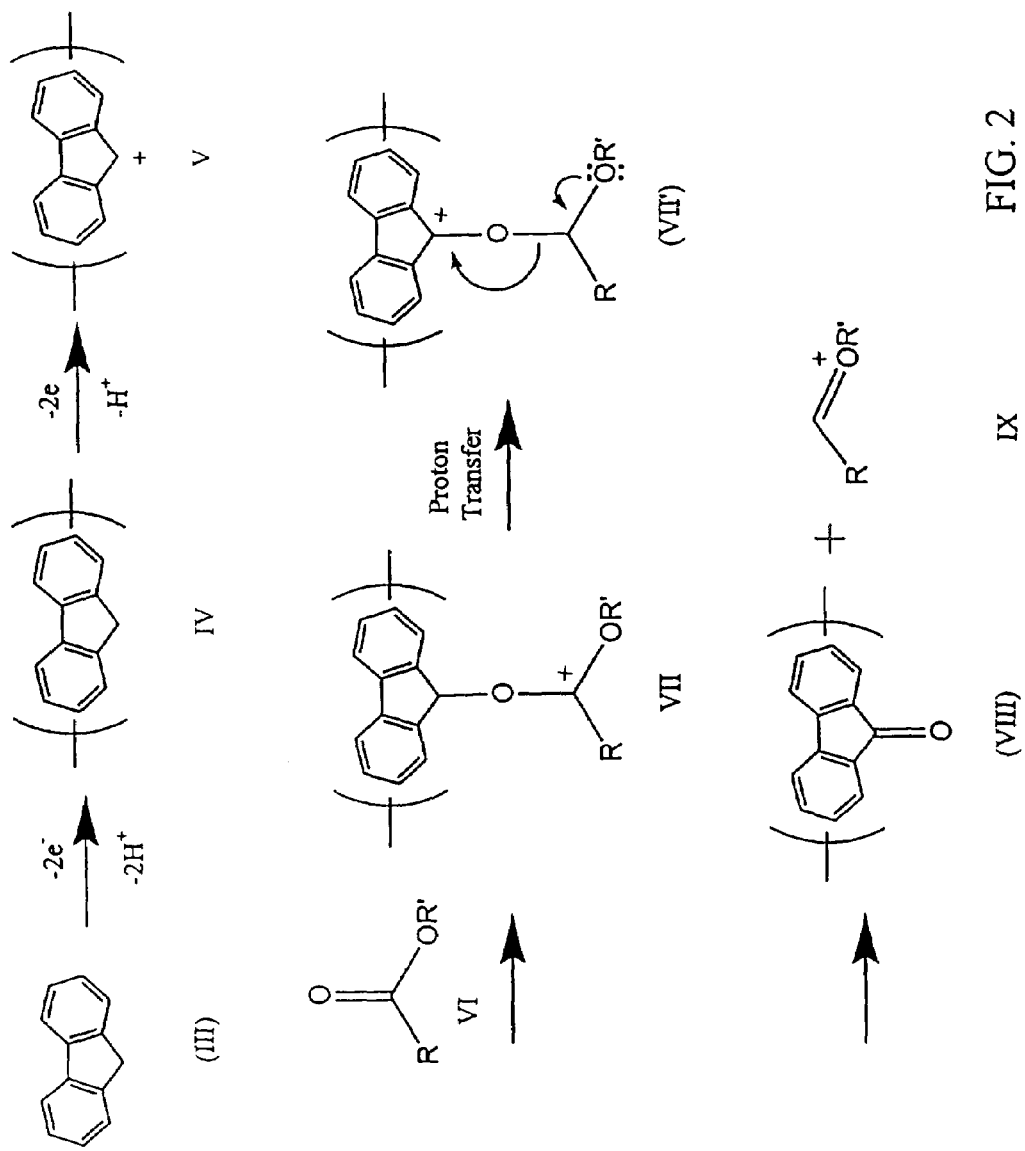
FIG. 2 shows one possible reaction scheme for the electrolysis of fluorene to poly(9-fluorenone) in the presence of an ester.

A possible mechanism for one preferred embodiment of an electrolysis method in accordance with the present invention is shown in FIG. 2. In the first step of the reaction, fluorene, represented by formula III, is electrolyzed, which polymerizes the fluorene into poly(fluorene), represented by formula IV. Note that the parenthetical representation of the polymer bond in formula IV, consistent with the definition of poly(fluorene), is used to represent polymers having any possible isomer units of fluorene within the polymer structure. In general, the poly(fluorene) is deposited on an electrode in the electrolytic cell. Continued electrolysis of the poly(fluorene) strips two electrons and a proton at the 9 positions of the recurring units of fluorene in the poly (fluorene), resulting in the ionic form of poly(fluorene), represented by formula V. The electrolysis is carried out in the presence of an ester, represented by formula VI, which reacts, via nucleophilic attack, with the ionic poly(fluorene) to create intermediary chemicals, represented by formula VII and VII'. Further reaction of the intermediary produces the poly(9-fluorenone), represented by formula VIII, and a byproduct, represented by formula IX. In general, the final polymer product is deposited as a film or solid on the electrode. Note that the R and R' groups on the ester may represent any number of functional groups as is more fully described below in the enumeration of esters for use with the present invention.

The concentration of fluorene in the electrolysis shown in FIG. 2 is preferably between 0.0001 and 10 mol/L, and more preferably 0.001 and 1 mol/L. The concentration of electrolyte in the electrolysis is preferably between 0.0001 and 10 mol/L, and more preferably 0.001 and 1 mol/L, and the concentration of ester in a mixture is preferably at least 10% (V/V) and more preferably at least 20% (V/V).

Figure 3:
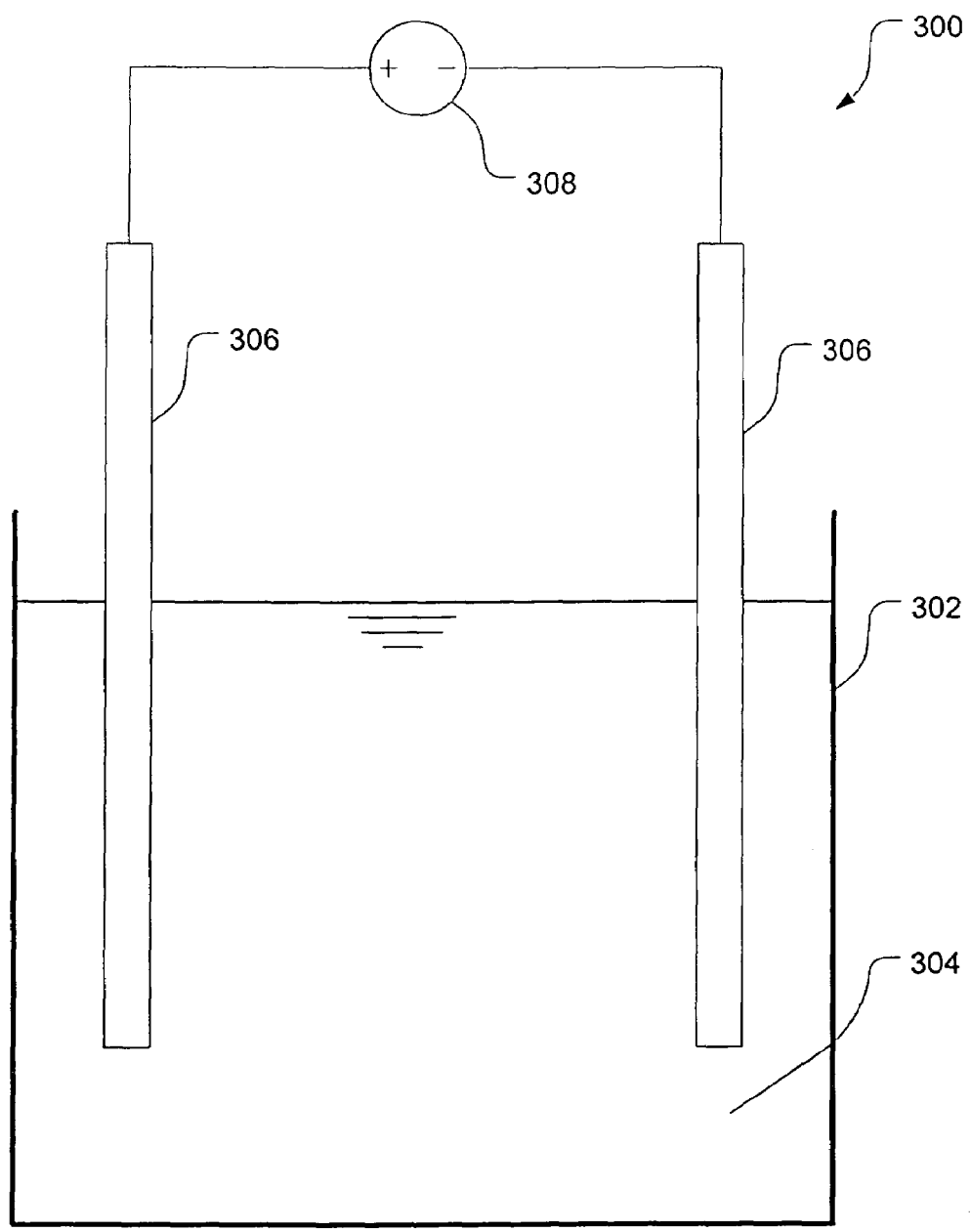
FIG. 3 shows a schematic representation of an electrolytic cell suitable for embodiments of the present invention.

A schematic representation of one embodiment of an electrolytic cell for use with the present invention is illustrated in FIG. 3. The electrolytic cell includes a vessel 302, electrolytic mixture 304, two electrodes 306, and a power source 308. The two electrodes 306 contact the electrolytic mixture 304 constrained within the vessel 302, and are connected by a power source 308. The power source 308 supplies a voltage potential between the electrodes 306, resulting in the current used in the electrolysis of fluorene to poly(9-fluorenone). It will be clear to one skilled in the art that any electrolytic cell configuration may be adapted to perform the methods of the invention, including the use of one or more additional reference electrodes (not shown) to assist in the control of the electric potential. Also note that multiple working electrodes and/or electrolytic cells may be used in the context of the present invention to increase the yield of poly(9-fluorenone) production. Embodiments of the present invention may utilize any method of electrolysis, including constant potential, constant current, and the potential sweep methods. The electric current density can be suitably selected for the adopted method or conditions, since it depends on the solvents, electrolytes, reagent concentrations, electrode materials, and other factors. In general, the current density is preferably between 0.001 and 100 mA/cm$^2$ and more preferably between 0.01 and 50 mA/cm$^2$ and further between 0.01 and 30 mA/cm$^2$. One or more reference electrodes may be included for voltage control.

As briefly noted above, in general, the poly(9-fluorenone) is deposited on an electrode 306 of the electrolytic cell 300. Typically, the deposition of the polymer begins immediately and, as the time proceeds, the rate of the deposition decreases. Additional fluorene may be added to the mixture during electrolysis. Depending on the circumstances, electrolysis is conducted for as long as 48 hours, and more preferably for 24 hours or less, before the polymer is harvested. The polymer can be easily removed from the electrode, e.g. by peeling, scraping, etc., and may be further dried by techniques well known in the art. In addition, if necessary, the polymer may be washed by an adequate solvent before or after the polymer has been removed from the electrode.

Figure 4:
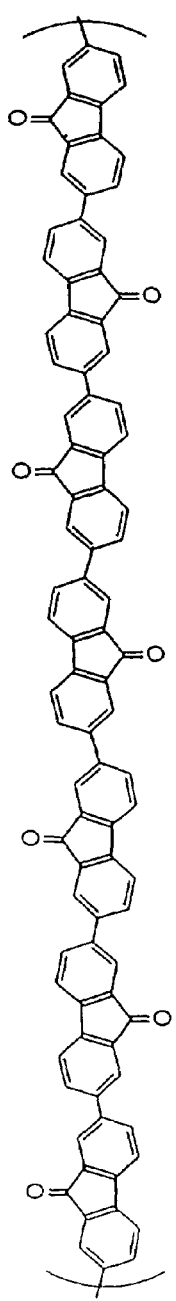
FIG. 4 illustrates the chemical structure of a portion of a 2,7-isomer of poly(9-fluorenone) produced by embodiments of the present invention.
Figure 5:
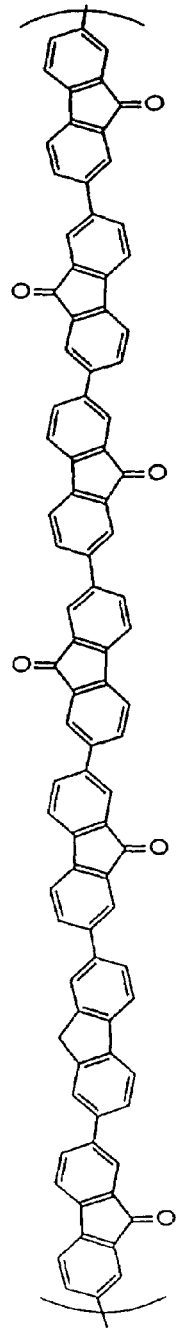
FIG. 5 illustrates the chemical structure of a portion of a 2,7-isomer of a polymer having 9-fluorenone units and fluorene units produced by an embodiment of the present invention.

The present invention includes utilizing the above method to produce poly(9-fluorenone) (one isomer of which is shown in FIG. 4) as well as polymers that have units of 9-fluorenone and fluorene (one isomer of which is shown in FIG. 5, and see Example 3). Polymers having units of other compounds, in addition to 9-fluorenone, may also result from the above-described method, and are envisioned to be within the scope of the present invention. The purity of the resulting poly(9-fluorenone) is dependent on a number of factors, including the electrolysis conditions and the nature and/or purity of the fluorene, esters, electrolytes, solvents, etc.

Methods Utilizing Electrolysis of Poly(Fluorene) in the Presence of an Ester.

Figure 6:
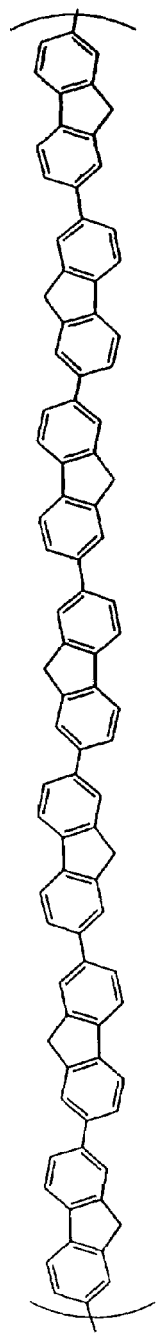
FIG. 6 shows the chemical structure of a portion of a 2,7-isomer of poly(fluorene).
Figure 7:
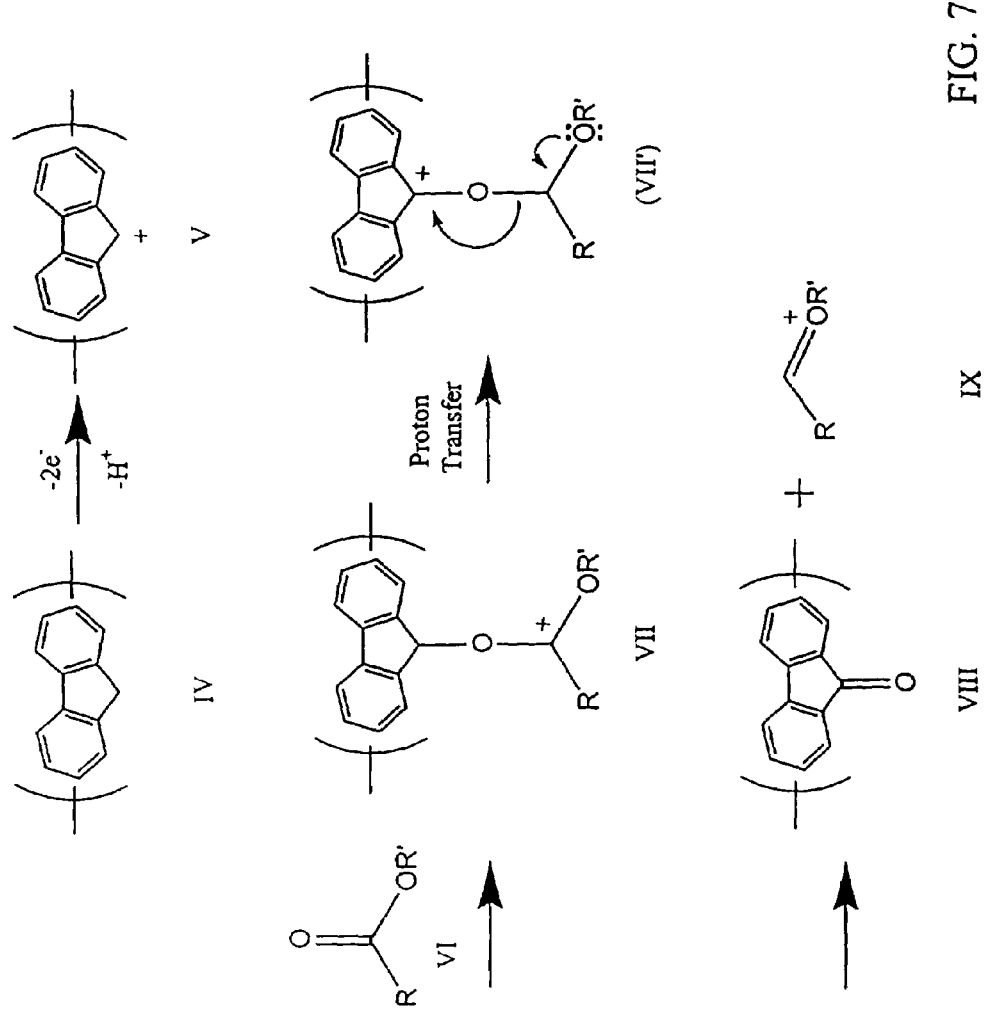
FIG. 7 shows one possible reaction scheme for the electrolytic oxidation of poly(fluorene) to produce poly(9-fluorenone).

In another embodiment of the present invention, poly (fluorene), such as the 2,7-isomer of poly(fluorene) as shown in FIG. 6, may be used as a starting material to prepare poly(9-fluorenone). In this embodiment, one possible reaction to fonn poly(9-fluorenone) is shown in FIG. 7. The reaction follows the same steps as described above in FIG. 2, except that the initial polymerization reaction is eliminated, and the reaction starts from poly(fluorene). Poly (fluorene) may be prepared by the electrolysis of fluorene (as shown above in FIG. 2), or may be prepared by a number of well known methods for use in the present invention. Schiavon, G., and Zotti, G., *Journal of Electroanalytical Chemistry*, Vol. 186, p.p. 191–199 (1985); Rault-Berthelot, J. and Simonet, J., *New Journal of Chemistry*, Vol. 10, No. 3-1986, p.p. 169–177 (1985); Waltman, R. J., and Diaz, A. F., *Journal of the Electrochemical Society*, Vol. 132, No. 3, p.p. 631–634 (1986).

Depending on the process used, the poly(fluorene) may include a number of impurities. Use of such "non-pure" polymers of fluorene is typical and expected and within the scope the invention. It should be noted that this may result in correspondingly "non-pure" end products of poly(9-fluorenone)-i.e. the percent (W/W) of 9-fluorenone units will be decreased relative to other polymer units. Poly(fluorene)

having at least one fluorene unit can be use and/or poly (fluorene) having at least 1% W/W fluorene units can be used, but preferably a polymer having at least 10% W/W fluorene units, more preferably a polymer having at least 50% W/W fluorene units, and most preferably at least 80% W/W fluorene units can be used as the starting material in the methods of the present invention. The poly(9-fluorenone) produced by this method has at least one fluorenone unit and/or has at least 1% W/W 9-fluorenone units and preferably has at least 10% W/W 9-fluorenone units and more preferably at least 50% W/W 9-fluorenone units and most preferably at least 80% 9-fluorenone units.

Componentsfor Electrolytic Production of Poly(9-Fluorenone):

Fluorene is common in nature and easily available. It is shown in FIG. 2 as formula III. References describing methods for the production of poly(9-fluorene), as shown as formula IV in FIGS. 2 and 7, include the following: Schiavon, G., and Zotti, G., *Journal of Electroanalytical Chemistry*, Vol. 186, p.p. 191–199 (1985); Rault-Berthelot, J. and Simonet, J., *New Journal of Chemistry*, Vol. 10, No. 3-1986, p.p. 169–177 (1985); Waltman, R. J., and Diaz, A. F., *Journal of the Electrochemical Society*, Vol. 132, No. 3, p.p. 631–634 (1986).

Esters usable in embodiments of the present invention include simple esters, carbonic esters, and lactones (a cyclic form of esters), in addition to other compounds that would be considered by a person skilled in the art to fall within the ester category. Preferable simple esters include those with melting points less than 100° C. For example: methyl formate; ethyl formate; propyl formate; isopropyl formate; butyl formate; isobutyl formate; t-butyl formate; phenyl formate; methyl acetate; ethyl acetate; propyl acetate; isopropyl acetate; butyl acetate; methyl propionate; ethyl propionate; propyl propionate; butyl propionate; methyl butyrate; and ethyl butyrate. Of these, the most preferable are methyl formate, ethyl formate, methyl acetate, ethyl acetate, methyl propionate, ethyl propionate, and methyl butyrate.

Carbonic esters usable in embodiments of the present invention are preferably those of which melting points are less than 100° C. In various embodiments, cyclic carbonic esters, such as ethylene carbonate, propylene carbonate, butylene carbonate, and trifluoropropylene carbonate, and acyclic carbonic esters, such as dimethyl carbonate, diethyl carbonate, bis(2,2,2-trifluoroethyl) carbonate, ethyl methyl carbonate, dipropyl carbonate, di-isopropyl carbonate, methyl propyl carbonate, ethyl propyl carbonate, methyl propyl carbonate, dibutyl carbonate, di-isobutyl carbonate, methyl butyl carbonate, ethyl butyl carbonate, diphenyl carbonate, methyl phenyl carbonate, and mixtures of these are used. From a viewpoint of the efficiency of the electrolysis and cost, ethylene carbonate, propylene carbonate, butylenes carbonate, dimethyl carbonate, diethyl carbonate, ethyl methyl carbonate, and mixtures of these are more preferable.

Lactones usable in embodiments of the present invention are preferably those that have melting points less than 100° C. For example: β-propiolactone; methyl-β-propiolactone; ethyl-β-propiolactone; propyl-β-propiolactone; isopropyl-β-propiolactone; phenyl-β-propiolactone; γ-butyrolactone; methyl-γ-butyrolactone; ethyl-γ-butyrolactone; δ-valerolactone; methyl-δ-valerolactone; ethyl-δ-valerolactone; ε-caprolactone; methyl-ε-caprolactone; and ethyl-ε-caprolactone. Of these, β-propiolactone, γ-butyrolactone, δ-valerolactone, and ε-caprolactone are more preferable.

An ester that is normally solid at the temperature at which the reaction is conducted may be dissolved in another, normally liquid, ester or in a solvent as described below.

Solvents may be used to dissolve the ester, fluorene, and/or the electrolyte, or to increase the yield of the product in embodiments of the present invention. Any solvent may be used that does not inhibit the role or effect of the ester or other components in the electrolysis. In various embodiments, the solvent may be: nitriles such as acetonitrile, propionitrile, and benzonitrile; nitro solvents such as nitromethane, nitroethane, and nitrobenzene; ethers such as tetrahydrofuran, diethyl ether, dimethoxyethane, and dioxane; halogenated alkanes such as dichloromethane, and dichloroethane; aromatic solvents such as benzene, toluene, chlorobenzene, and fluorobenzene; and mixtures of any of the above. The total concentration of ester in the solvent may be any concentration in which the reaction can occur. Although it depends on the nature of the solvent used and other factors, in a preferred embodiment the total concentration of ester in the electrolyte mixture is more than 10% V/V, and in most preferred embodiment the total concentration of ester is more than 20% V/V.

Electrolytes used in electrolytic mixtures in embodiments of the present invention consist of a cation part and an anion part. Examples of cation parts are: an alkali metal ion such as ions of lithium, sodium, or potassium; a quaternary ammonium ion; an onium ion; and a phosphonium ion. In preferred embodiments, an alkali metal ion and a quaternary ammonium ion are used. Examples of anion parts are: hexafluorophosphate ion ($PF_6^-$), tetrafluoroborate ion ($BF_4^-$), hexafluoroarsenate ion ($AsF6^-$), hexafluoroantimonate ion ($SbF_6^-$), perchlorate ion ($ClO_4^-$), triflate ion ($CF_3SO_3^-$), bis(trifluoromethanesulfonyl)imide ion (($CF_3SO_2)_2N^-$), and trifluorotris(pentafluoroethyl)phosphate anion ($PF_3(C_2F_5)_3^-$). In preferred embodiments, $BF_4^-$ and $PF_6^-$ are used.

Embodiments of the present invention include using lithium hexafluorophosphate ($LiPF_6$), sodium hexafluorophosphate ($NaPF_6$), potassium hexafluorophosphate ($KPF_6$), lithium tetrafluoroborate ($LiBF_4$), sodium tetrafluoroborate ($NaBF_4$), potassium tetrafluoroborate ($KBF_4$), tetramethylammonium tetrafluoroborate (($CH_3)_4NBF_4$), tetraethylammonium hexafluorophosphate (($C_2H_5)_4NPF_6$), tetraethylammonium tetrafluoroborate (($C_2H_5)_4NBF_4$), tetrapropylammonium tetrafluoroborate (($C_3H_7)_4NBF_4$), tetrabutylammonium tetrafluoroborate (($C_4H_9)_4NBF_4$), tetrabutylammonium hexafluorophosphate (($C_4H_9)_4NPF_6$), tetrahexylammonium hexafluorophophate (($C_6H_{13})_4NPF_6$), tetrahexylammonium tetrafluoroborate (($C_6H_{13})_4NBF_4$), benzyltrimethylammonium tetrafluoroborate, benzyltrimethylammonium hexafluorophosphate, lithium perchlorate ($LiClO_4$), tetraethylammonium perchlorate (($C_2H_5)_4NClO_4$), tetrabutylammonium perchlorate (($C_4H_9)_4NClO_4$), lithium hexafluoroarsenate ($LiAsF_6$), lithium hexafluoroantimonate ($LiSbF_6$), lithium triflate ($CF_3SO_3Li$), tetramethylammonium triflate ($CF_3SO_3N(CH_3)_4$), tetraethylammonium triflate ($CF_3SO_3N(C_2H_5)_4$), lithium bis(trifluoromethanesulfonyl)imide (($CF_3SO_2)_2NLi$), bis(pentafluoroethanesulfonyl)imide (($C_2F_5SO_2)_2NLi$), lithium trifluorotris(pentafluoroethyl)phosphate ($LiPF_3(C_2F_5)_3$) and mixtures of any of these as electrolytes. Among them, $LiPF_6$, $NaPF_6$, $KPF_6$, $LiBF_4$, $NaBF_4$, $KBF_4$, ($CH_3)_4NPF_6$, ($CH_3)_4NBF_4$, ($C_2H_5)_4NPF_6$, ($C_2H_5)_4NBF_4$ are more preferable from a view point of cost, yield of the polymer, and safety.

Electrode materials usable in electrolysis, in embodiments of the present invention, may be any of the conventional electrode materials for the electrolysis of organic compounds. Embodiments of the present invention include using, for example: metals such as platinum, gold, silver, nickel, iron, stainless steel, rhodium, iridium, aluminum, molybdenum, titanium, palladium, copper and the like; carbons such as graphite, acetylene black, glassy carbon and the like; metal oxides such as $SnO_2$, $In_2O_3$, $TiO_2$, $PbO_2$, $IrO_2$, $RuO_2$, and the like; and mixtures of these materials. The electrodes may also be coated with these materials. Among them, electrodes made of platinum, nickel, stainless steel, copper, carbons, and $PbO_2$ and electrodes coated with them such as, a titanium electrode coated with platinum or $PbO_2$ are preferable.

Chemical Oxidation to Produce Polymers Containing Cyclopentanone Structures:

Additional embodiments of the present invention include the production of polymers containing at least one unit having at least one cyclopentanone structure condensed with at least two aromatic rings, via chemical oxidation of polymer starting materials having at least one unit containing at least one cyclopentane structure condensed with at least two aromatic rings. One preferred embodiment of the polymer starting material for use in the present invention has the polymers that have at least one unit of a general formula (X):

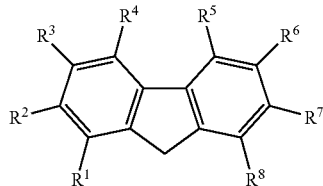

wherein any of the adjacent groups $R^1$ and $R^2$, $R^2$ and $R^3$, $R^3$ and $R^4$, $R^5$ and $R^6$, $R^6$ and $R^7$, $R^7$ and $R^8$ may be bonded together by a group of the general formula —$CR^9$=$CR^{10}$—$CR^{11}$=$CR^{12}$—, or having a general formula (XI):

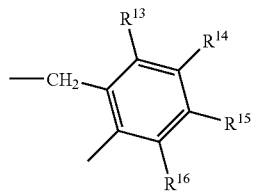

thus forming additional ring structures. Furthermore, the adjacent group $R^4$ and $R^5$ may be bonded together by a group with the general formula —$CR^{17}$=$CR^{18}$— or —$CH_2$—. Simultaneously, at least two of the groups $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, and $R^{18}$ are single bonds. The remaining groups can be any combination of hydrogen atoms, halogen atoms, alkyl groups of $C_1$ to $C_{10}$, haloalkyl group of $C_1$ to $C_{10}$, aryl groups of $C_6$ to $C_{10}$, alkoxy groups of $C_1$, to $C_{10}$, aryloxy groups of $C_6$ to $C_{10}$, alkoxycarbonyl groups of $C_2$ to $C_{10}$, and aryloxycarbonyl groups of $C_7$ to $C_{11}$.

For the purpose of illustration, the chemical oxidation of poly(fluorene) to produce poly(9-fluorenone) is presented in detail. However, the methods described for the chemical oxidation of poly(fluorene) to poly(9-fluorenone) are equally applicable to any polymer containing at least one unit having at least one cyclopentane structure condensed with at least two aromatic rings, and are all considered to be within the scope of the present invention.

Methods Utilizing Chemical Oxidation of Poly(Fluorene):

Another embodiment of the present invention is a method for the production of poly(9-fluorenone) via chemical oxidation of poly(fluorene). The method comprises reacting poly(fluorene), prepared as discussed above, with a chemically prepared oxidizing agent. The reaction oxidizes one, some or all of the recurring units of fluorene in the polymer, producing a corresponding polymer of poly(9-fluorenone).

The reaction temperature is preferably between 0 and 200° C., and more preferably between room temperature and 180° C. In order to conduct the oxidation smoothly, the molar ratio of oxygen atoms available from the oxidizing agent to fluorene units within the polymer is preferably 0.5 or more, and more preferably 0.8 to 10. Reaction times are dependent on reactant concentrations, temperatures, etc, but are typically from 0.1 to 48 hours and more preferably from 0.2 to 24 hours.

The resultant poly(9-fluorenone) may contain non-oxidized fluorene units (as shown in FIG. 5), seen in Example 3, and discussed above. The amount of fluorene units in the polymer and/or other impurities depends on the purity of the starting materials, the reaction conditions of the chemical oxidation, i.e., concentration, nature or amount of chemically prepared oxidizing agent, solvent; the reaction temperature, reaction time, and others. The poly(9-fluorenone) produced by this method has at least one 9-fluorenone unit and/or at least 1% W/W 9-fluorenone units, and preferably has at least 10% W/W 9-fluorenone units, more preferably has at least 50% W/W 9-fluorenone units and more preferably at least 80% 9-fluorenone units.

Components for Chemical Oxidation of Poly(Fluorene):

Chemically prepared oxidizing agents of the present invention may include, but are not limited to, bichromic acid and its salts; chromic acid and its salts, chromic oxide ($Cro_3$); permanganic acid and its salts; periodic acid and its salts, perbromic acid and its salts, perchlonic acid and its salts; percarboxylic acids and their salts such as peracetic acid and its salts, performic acid and its salts, perpropionic acid and its salts, perbutyric acid and its salts, perbenzoic acid and its salts, m-chloroperbenzoic acid and is salts, perphthalic acid and its salts, trifluoroperacetic acid and its salts; persulfuric acid and its salts; perphosphoric acid and its salts, hydrogen peroxide and its salts; and any mixtures of these compounds. As the cationic parts of the salts described above, metals and ammonium can be used, while alkali metals and alkali earth metals are more preferable. Among them, alkali metal salts of bichromic acid (bichromates), alkali metal salts of permanganic acid (permanganates), and percarboxylic acids are preferable because of efficiency of production and cost.

In some preferred embodiments, a solvent can be added to the reaction for the oxidation of the poly(fluorine). As an example of these embodiments, the oxidizing agent or agents are added to the mixture of the poly(9-fluorene) and the solvent and the oxidation reaction then occurs. Any solvent may be used for this purpose, as long as it does not prohibit the oxidation reaction. Preferred solvents include: aliphatic carboxylic acids such as acetic acid, propionic acid, and butyric acid; fluorinated aliphatic carboxylic acids such as trifluoroacetic acid and pentafluoropropionic acid and the like; halogenated hydrocarbons such as methylene chloride, chloroform, carbon tetrachloride, dichloroethane, tzichloroethane, trichlorotrifluoroethane; water and their mixtures.

Among them, aliphatic carboxylic acids are more preferable because of cost of production.

Having generally described the invention, the same will be more readily understood by reference to the following examples, which are provided by way of illustration and are not intended as limiting.

EXAMPLES

Example 1

In a vessel for electrolysis (width 170 mm×depth 60 mm×height 150 mm), three nickel plates (each 150 mm×100 mm×0.127 mm) were installed in parallel. The inner nickel plate was a working electrode (anode) and the two outer nickel plates were counter electrodes (cathode). 1.2 L of a mixture of fluorene (0.01 mol/L) and $LiPF_6$ (0.1 mol/L) in propylene carbonate was added to the vessel. The three nickel plates were immersed in the mixture to a depth of 90 mm each. The electrolysis was carried out by a constant-current method. The electrolysis was carried out for 5 hours under the constant-currents of 0.2 A, 0.15 A, 0.1 A, 0.06 A, 0.03 A and finally 0.015 A with an upper limit of 9V each time. After 5 hours, the inner electrode (anode), on which the polymer was deposited, was pulled out of the electrolyte mixture. The polymer was peeled away from the electrode and the plate immersed into the electrolyte mixture, and the electrolysis was repeated 4 times. The collected polymer was washed with propylene carbonate and then with acetonitrile, and dried at 120° C. for 3 hours under vacuum to give 0.89 g of poly(9-fluorenone) as a dark brown to black solid. The yield was calculated to be 45% poly(9-fluorenone) based on the amount of fluorene used. The spectral data confirmed that the product was in fact poly(9-fluorenone). The IR spectrum showed a strong absorption band at 1714 $cm^{-1}$ characteristic of the stretching vibration of carbonyl (C=O) of the 9-fluorenone structure. The physical and spectral data are shown below for an analytical sample, dried at 170° C. under vacuum for 12 hours:

Melting points; more than 400° C.
IR spectrum (KBr, $cm^{-1}$);
   3040(w), 2921(w), 1714(s) (C=O), 1606(s), 1455(s), 1405(m), 1229(m), 816(s), 765(s), 735(m)
Elemental analysis;
   Found: C, 83.69%; H, 4.24%; O, 10.22%; F; 0.49%; P, 0.51%: total 99.15%.
   Calcd for $C_{13}H_6O$: C, 87.63%; H, 3.37%; O, 8.98%.

Example 2

In a vessel for electrolysis (width 170 mm×depth 60 mm×height 150 mm), three nickel plates (each 150 mm×100 mm×0.127 mm) were installed in parallel. The inner nickel plate was a working electrode (anode) and the two outer nickel plates were counter electrodes (cathode). 1.2 L of a mixture of fluorene (0.01 mol/L) and $LiPF_6$ (0.1 mol/L) in propylene carbonate was added to the vessel. The three nickel plates were immersed in the mixture to a depth of 90 mm. Two lithium metal sheets (12mm×30mm×0.38mm) were used as reference electrodes. Each sheet was placed between the anode and the cathode. The electrolysis was carried out by a potential-sweep method. The electrolysis was carried out for 4 hours under a potential width of 4.5–6.7 V and a sweep time of 50 mV/sec. The inner electrode (anode) on which the polymer was deposited was pulled out of the electrolyte mixture, and the polymer was peeled off. The plate was immersed again in the electrolyte mixture. The electrolysis was repeated two times. The collected polymer was washed with propylene carbonate and then with acetonitrile, and dried at 120° C. for 5 hours under vacuum to give 0.31 g of poly(9-fluorenone) as a dark brown to black solid. The yield was calculated to be 16% based on the amount of fluorene used. The spectral data confirmed that the polymer was poly(9-fluorenone). The IR spectrum showed a strong absorption band at 1714 $cm^{-1}$ characteristic of the stretching vibration of carbonyl (C=O) of the 9-fluorenone structure. The physical and spectral data are shown below for an analytical sample, dried at 170° C. under vacuum for 12 hours.

Melting points; more than 400° C.
IR spectrum (KBr, $cm^{-1}$);
   3051(w), 2916(w), 1714(s)(C=O), 1606(s), 1454(s), 1405(m), 1263(m), 815(s), 767(s), 735(s)
Elemental analysis;
   Found: C, 85.94%; H, 4.29%; O, 8%; F; 0.31%; P, 0.21%: total 98.75%.
   Calcd for $C_{13}H_6O$: C, 87.63%; H, 3.37%; O, 8.98%.

Example 3

In a vessel for electrolysis (width 170 mm×depth 60 mm×height 150 mm), three nickel plates (each 150 mm×100 mm×0.127 mm) were installed in parallel. The inner nickel plate is a working electrode (anode) and the two outer nickel plates are counter electrodes (cathode). 1.2 L of a mixture of fluorene (0.05 mol/L) and $LiPF_6$ (0.2 mol/L) in propylene carbonate was added to the vessel. The three nickel plates were immersed in the mixture to a depth of 90 mm. The electrolysis was carried out by a constant potential method. The electrolysis was continued for 4 hours under the constant potential of 6.6 V, after a constant current of 2 A was flowed till the potential went up to 6.6V. The inner electrode (anode) was pulled out of the electrolyte mixture, and the polymer peeled off. The plate was again immersed into the electrolyte mixture. The electrolysis was repeated three times. The collected polymer was washed with propylene carbonate and then with acetonitrile, and dried at 170° C. for 2 hours under vacuum to give 3.83 g of the polymer as a dark brown to black solid. The yield was calculated to be 38% based on the amount of fluorene used. The IR spectrum showed an absorption band at 1716 $cm^{-1}$ characteristic of the stretching vibration of carbonyl (C=O) of the 9-fluorenone structure. This polymer was determined to be a polymer that contained 9-fluorenone units and fluorene units, calculated to be about 37:63 ratio of 9-fluorenone units to fluorene units, based on the oxygen content data of elemental analysis. The physical and spectral data are shown below:

Melting points; more than 400° C.
IR spectrum (KBr, $cm^{-1}$);
   3044(w), 3018(w), 2918(w), 2889(w), 1716(m) (C=O), 1607(m), 1453(s), 1403(s), 1292(m), 1002 (w), 952(w), 864(w), 816(s), 766(s), 735(s)
Elemental analysis;
   Found: C, 91.42%; H, 4.66%; O, 3.52%; F; 0.17%; P, 0.06%: total 99.83%.
   Calcd for $C_{13}H_6O$: C, 87.63%; H, 3.37%; O, 8.98%.

Example 4

A 100 mL-vessel contained a platinum plate (25 mm×20 mm) as a working electrode (anode), a platinum mesh (35 mm×30 mm) as a counter electrode (cathode), and a reference electrode of $Ag/AgNO_3$. 25 mL of a mixture of fluorene (0.01 mol/L) and $(C_2H_5)_4NPF_6$ (0.1 mol/L) in propylene carbonate was added to the vessel. The electrolysis vessel was purged with argon gas, and the electrolysis carried out for 3 hours at a constant potential of 2.4V (vs. $Ag/AgNO_3$). The polymer obtained was dried at 120° C. for 2 hours under vacuum to give 7.8 mg of poly(9-fluorenone) as a dark brown to black solid. The physical and spectral data of this polymer agreed with those of the sample of poly(9-fluorenone), shown in Examples 1 and 2.

Examples 5–18

Examples 5–18 were carried out under the conditions shown in Table 1, and similar to Example 4. The results are also shown in Table 1. In example 18, a lithium electrode was used as a reference electrode. Examples 5–8, 10, and 15 were carried out by the constant-potential method, and Examples 9, 11–14, and 16–18 by the potential-sweep method. The potential and reaction time are shown for the constant potential method, and the potential-sweep time per second, the potential-sweep width, and reaction time are shown for the potential-sweep method. Symbols shown in Table 1 are: PC=propylene carbonate, Pt=platinum plate, Pt mesh=platinum mesh, Ni=nickel plate, GC=glassy carbon plate, SS=stainless steel plate, Cu=copper plate, A=potential-sweep method, B=constant-potential method, hr=hour. All the products obtained were dark brown to black solid and were identified as polymers having a recurring unit of the 9-fluorenone structure, based on an absorption band of around 1715 $cm^{-1}$, characteristic of the stretching vibration of carbonyl (C=O) of the fluorenone structure.

Example 19

Electrolysis of Fluorene in a Simple Ester

A vessel in which a platinum plate (25 mm×35 mm) as a working electrode (anode), a platinum mesh (40 mm×30 mm) as a counter electrode (cathode), and a reference electrode of $Ag/AgNO_3$ are set, 100 mL of a mixture of fluorene (0.01 mol/L) and of $LiPF_6$ (0.1 mol/L) in ethyl acetate was added. After the electrolysis vessel was purged with argon gas, and the electrolysis carried out for 12 hours at the constant potential of 1.35V (vs. $Ag/AgNO_3$). Total amount of electric current was 5.59 mA/h. The polymer was deposited on the working electrode, peeled off, and dried at 170° C. for 2 hours under vacuum (1 mmHg) to give 0.4 mg of poly(9-fluorenone) as a dark brown to black solid. The IR spectral data of this polymer agreed with those of poly(9-fluorenone) obtained by the electrolysis in propylene carbonate.

Example 20

Electrolytic Oxidation of Poly(Fluorene)

According to the literature, poly(fluorene) was prepared by the electrolytic polymerization of fluorene in acetonitrile containing $LiPF_6$ (0.1 mol/L) in an electrolytic cell installed with a platinum plate (40 mm×25 mm) as a working electrode (anode), a platinum mesh (40 mm×35 mm) as a counter electrode (cathode), and a reference $Ag/AgNO_3$ electrode. The conditions of the polymerization were a

TABLE 1

| | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|
| Concentration of Fluorene (mol/L) | 0.01 | 0.005 | 0.01 | 0.01 | 0.01 | 0.01 | 0.01 | 0.1 | 0.01 | 0.01 |
| Electrolyte & Concentration (mol/L) | $LiPF_6$ 0.1 | $LiPF_6$ 0.1 | $LiPF_6$ 0.2 | $Et_4NBF_4$ 0.1 | $LiPF_6$ 0.1 | $LiPF_6$ 0.1 | $LiPF_6$ 0.05 | $LiPF_6$ 0.5 | $LiPF_6$ 0.1 | $LiPF_6$ 0.1 |
| Ester & Amount used (mL) | PC 100 | PC 100 | PC 100 | PC 25 | PC 50 | PC 25 | PC 25 | PC 25 | PC 50 | PC 10 |
| Working Electrode (Anode) mm × mm | Pt 25 × 40 | Pt 25 × 40 | Pt 25 × 40 | Pt 25 × 20 | Ni 25 × 25 | Ni 25 × 20 | Ni 25 × 20 | Ni 25 × 20 | GC 25 × 25 | GC 10 × 20 |
| Counter Electrode (Cathode) mm × mm | Pt mesh 40 × 35 | Pt mesh 40 × 35 | Pt mesh 40 × 35 | Pt mesh 35 × 30 | Ni 25 × 25 | Ni 25 × 20 | Ni 25 × 20 | Ni 25 × 20 | Ni 25 × 25 | GC 10 × 20 |
| Electrolysis Conditions | B 1.6 V 4 hr | B 1.6 V 4 hr | B 1.6 V 4 hr | B 2.4 V 3 hr | A 50 mV/s 0.5–2.7 V 12.3 hr | B 2.7 V 3 hr | A 20 mV/s 1.7–2.7 V 6 hr | A 20 mV/s 1.7–2.7 V 6 hr | A 50 mV/s 0.5–2.7 V 12.3 hr | A 50 mV/s 0.5–2.6 V 12.8 hr |
| Yield of Polymer (mg) | 10.8 | 9.6 | 12.1 | 3.7 | 17.5 | 5.6 | 5.6 | 48.8 | 36.3 | 7.3 |

| | Ex. 15 | Ex. 16 | Ex. 17 | Ex. 18 |
|---|---|---|---|---|
| Concentration of Fluorene (mol/L) | 0.01 | 0.01 | 0.01 | 0.01 |
| Electrolyte & Concentration (mol/L) | $LiPF_6$ 0.05 | $LiPF_6$ 0.1 | $LiPF_6$ 0.1 | $LiPF_6$ 0.1 |
| Ester & Amount used (mL) | PC 50 | PC 50 | PC 50 | PC 50 |
| Working Electrode (Anode) mm × mm | GC 25 × 25 | GC 25 × 25 | SS 30 × 30 | Ni 25 × 30 |
| Counter Electrode (Cathode) mm × mm | GC 25 × 25 | Cu 25 × 25 | SS 30 × 30 | Ni 25 × 30 |
| Electrolysis Conditions | B 2.5 V 4 hr | A 50 mV/s 0.5–2.7 V 12.3 hr | A 50 mV/s 0.5–2.7 V 12.3 hr | A 50 mV/s 4.0–6.8 V 15.8 hr |
| Yield of Polymer (mg) | 7.7 | 25.2 | 16.9 | 17.7 | constant potential of 1.35 V and a total current amount flowed of 2.60 mAh. The platinum plate in which the back side of the plate was coated with a poly(vinylidene fluoride) film was used for the electrolytic polymerization. The resulting poly(fluorene) was deposited on the front side of the platinum plate.

The platinum plate having poly(fluorene) was then set in another electrolytic cell having a platinum mesh (40 mm×35 mm), a reference Ag/AgNO$_3$ electrode, and propylene carbonate containing LiPF$_6$ (0.1 mol/L). The poly(fluorene) was electrolytically oxidized in the electrolytic cell; the electric current amount flowed between the electrodes at 2.7 V was 5.0 mAh. The resulting product was peeled from the platinum plate, resulting in 5.0 mg of poly(fluorenone) as a dark brown to black solid. In the IR spectrum, there was observed a strong absorption band at 1716 cm$^{-1}$ characteristic of the stretching vibration of carbonyl (C=O) of the fluorenone structure.

IR spectrum (KBr, cm$^{-1}$); 3042(w), 2977(w), 2924(w), 1716(s)(C=O), 1608(s), 1453(m), 1232(s), 818(s), 787(w), 766(w).

Example 21

Chemical Oxidation of Poly(Fluorene)

To a mixture of 164 mg (1 mmol/fluorene unit) of poly(fluorene) and 4 mL of acetic acid, was added 983 mg (3.3 mmol) of sodium bichromate dihydrate. The reaction mixture was refluxed for 5 hours, and the reaction mixture poured into ice water. The solid was filtered, washed with water and methanol, and dried at 170° C. for 1 hour to give 149 mg (84%) of poly(9-fluorenone). The product was confirmed as poly(9-fluorenone) by spectral analysis; in the IR spectrum, a strong absorption band at 1715 cm$^{-1}$ characteristic of the stretching vibration of carbonyl (C=O) of the 9-fluorenone structure was observed, while the absorption bands around 2920 cm$^{-1}$ corresponding to the 9-methylene (CH$_2$) of the fluorene structure essentially disappeared.

IR spectrum (KBr, cm$^{-1}$); 3048(w), 1715(s)(C=O), 1604(s), 1452(s), 1234(m), 1187(m), 1114(s), 831(m), 787 (w), 764(m), 740(m), 678(w), 669(w), 653(w).

The poly(fluorene) used in this Example was prepared by electrolytic polymerization of fluorene (0.01 mol/L) in acetonitrile using LiPF$_6$ (0.1 mol/L) as an electrolyte according to the literature. *Journal of Electrochemical Society*, Vol. 132, p.p. 631–634 (1985).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

The entire disclosure and all publications cited herein are hereby incorporated by reference.

What is claimed is:

1. A method for the production of a polymer having at least one unit that contains at least one cyclopentanone structure condensed with at least two aromatic rings, the method comprising:

chemically oxidizing an aromatic compound polymer having at least one unit that contains at least one cyclopentane structure condensed with at least two aromatic rings with a chemically prepared oxidizing agent.

2. The method of claim 1 wherein the chemically prepared oxidizing agent is selected from the group consisting of alkali metal salts of bichromic acid (bichromates), alkali metal salts of permanganic acid (permanganates), percarboxylic acids, and mixtures thereof.

3. The method of claim 1 wherein the oxidizing step is carried out at a temperature in the range of 20–180 degrees Celsius.

4. The method of claim 1 wherein the aromatic compound polymer having at least one unit that contains at least one cyclopentane structure condensed with at least two aromatic rings is dissolved or suspended in a solvent, the solvent is selected from the group consisting essentially of aliphatic carboxylic acids, fluorinated aliphatic carboxylic acids, halogenated hydrocarbons, water, and mixtures thereof.

5. The method of claim 1 wherein the molar ratio of oxygen atoms available from an oxidizing agent to a unit within the polymer is at least 0.5.

6. The method of claim 1 wherein the polymer having at least one unit that contains at least one cyclopentanone structure condensed with at least two aromatic rings is poly(fluorenone) and the aromatic compound polymer having at least one unit that contains at least one cyclopentane structure condensed with at least two aromatic rings is poly(fluorene).

7. The method of claim 1 wherein the polymer having at least one unit that contains at least one cyclopentanone structure condensed with at least two aromatic rings is poly(cyclopenta[def]phenanthren-4-one) and the aromatic compound polymer having at least one unit that contains at least one cyclopentane structure condensed with at least two aromatic rings is poly(4H-cyclopenta[def]phenanthrene).

8. The method of claim 1 wherein the polymer having at least one unit that contains at least one cyclopentanone structure condensed with at least two aromatic rings is poly(8H-cyclopenta[def]fluoren-4-one) and the aromatic compound polymer having at least one unit that contains at least one cyclopentane structure condensed with at least two aromatic rings is poly(4,8-dihydro-cyclopenta[def]fluorene).

9. The method of claim 1 wherein the polymer having at least one unit that contains at least one cyclopentanone structure condensed with at least two aromatic rings is poly(cyclopenta[def]fluorene-4,8-dione) and the aromatic compound polymer having at least one unit that contains at least one cyclopentane structure condensed with at least two aromatic rings is poly(4,8-dihydro-cyclopenta[def]fluorene).

10. The method of claim 1 wherein the polymer having at least one unit that contains at least one cyclopentanone structure condensed with at least two aromatic rings is poly(benzo[b]fluoren-11-one) and the aromatic compound polymer having at least one unit that contains at least one cyclopentane structure condensed with at least two aromatic rings is poly(11 H-benzo[b]fluorene).

11. The method of claim 1 wherein the polymer having at least one unit that contains at least one cyclopentanone structure condensed with at least two aromatic rings is poly(dibenzo[b,h]fluoren-12-one) and the aromatic compound polymer having at least one unit that contains at least one cyclopentane structure condensed with at least two aromatic rings is poly(12H-dibenzo[b,h]fluorene).

12. The method of claim 1 wherein the polymer having at least one unit that contains at least one cyclopentanone structure condensed with at least two aromatic rings is poly(indeno[1,2-b]fluorene-6,12-dione) and the aromatic compound polymer having at least one unit that contains at least one cyclopentane structure condensed with at least two aromatic rings is poly(6,12-dihydro-indeno[1,2-b]fluorene).

* * * * *